US007073033B2

(12) United States Patent
Sexton et al.

(10) Patent No.: US 7,073,033 B2
(45) Date of Patent: Jul. 4, 2006

(54) MEMORY MODEL FOR A RUN-TIME ENVIRONMENT

(75) Inventors: Harlan Sexton, Palo Alto, CA (US); David Unietis, San Francisco, CA (US); Peter Benson, Boulder, UT (US)

(73) Assignee: Oracle International Corporation, Redwood Shores, CA (US)

( * ) Notice: Subject to any disclaimer, the term of this patent is extended or adjusted under 35 U.S.C. 154(b) by 544 days.

(21) Appl. No.: 10/434,483

(22) Filed: May 8, 2003

(65) Prior Publication Data

US 2003/0225740 A1 Dec. 4, 2003

Related U.S. Application Data

(63) Continuation-in-part of application No. 09/512,620, filed on Feb. 25, 2000, now Pat. No. 6,854,114.

(60) Provisional application No. 60/378,391, filed on May 8, 2002.

(51) Int. Cl.
*G06F 12/00* (2006.01)

(52) U.S. Cl. ............... 711/153; 711/147; 711/148; 711/168; 711/173; 711/172; 711/129; 709/214; 709/215; 709/216; 345/541; 345/542; 345/543; 345/544; 707/2; 707/3; 707/4; 707/5

(58) Field of Classification Search .............. None
See application file for complete search history.

(56) References Cited

U.S. PATENT DOCUMENTS 5,414,848 A    5/1995  Sandage et al. ............ 395/650
5,465,351 A *  11/1995 Lemmo ....................... 707/10
5,692,193 A    11/1997 Jagannathan et al. ....... 395/676
5,745,703 A    4/1998  Cejtin et al. ........... 395/200.68
5,815,574 A *  9/1998  Fortinsky .................... 713/153
5,920,720 A    7/1999  Toutonghi et al. .......... 395/705
6,047,053 A *  4/2000  Miner et al. ........... 379/201.01
6,058,460 A *  5/2000  Nakhimovsky ............. 711/153
6,075,938 A    6/2000  Bugnion et al. ........ 395/500.48
6,223,202 B1   4/2001  Bayeh ......................... 709/102
6,269,391 B1   7/2001  Gillespie .................... 709/100
6,282,702 B1   8/2001  Ungar .......................... 717/5
6,324,177 B1   11/2001 Howes et al. ............... 370/389
6,330,709 B1   12/2001 Johnson et al. ............... 717/1
6,370,687 B1   4/2002  Shimura .................... 717/146
6,374,286 B1   4/2002  Gee et al. .................. 709/108
6,393,605 B1   5/2002  Loomans .................... 717/121
6,401,109 B1 * 6/2002  Heiney et al. ................ 718/1

(Continued)

OTHER PUBLICATIONS

Multiple Server WWW-based Synthesis of VLSI Circuits, D. Nalbantis, IEEE 1998.*

*Primary Examiner*—Mano Padmanabhan
*Assistant Examiner*—Mardochee Chery
(74) *Attorney, Agent, or Firm*—Hickman Palermo Truong & Becker LLP

(57) ABSTRACT

A memory model for a run-time environment is disclosed that includes a process-specific area of memory where objects in call-specific area of memory and session-specific area of memory can be migrated to at the end of a database call. User-specific objects can be then migrated to the session-specific area of memory. In one embodiment, the process-specific area of memory can be saved in a disk file and used to hot start another instance of an application server.

20 Claims, 3 Drawing Sheets

U.S. PATENT DOCUMENTS

| | | | |
|---|---|---|---|
| 6,457,142 B1 | 9/2002 | Klemm et al. | 714/38 |
| 6,463,480 B1 | 10/2002 | Kikuchi et al. | 709/315 |
| 6,516,342 B1 * | 2/2003 | Feldman et al. | 709/216 |
| 6,519,594 B1 * | 2/2003 | Li | 707/10 |
| 6,598,142 B1 * | 7/2003 | Paavilainen et al. | 711/173 |
| 6,604,046 B1 * | 8/2003 | Van Watermulen et al. | 701/208 |
| 6,609,153 B1 | 8/2003 | Salkewicz | 709/223 |
| 6,618,737 B1 | 9/2003 | Aridor et al. | 707/205 |
| 6,629,113 B1 | 9/2003 | Lawrence | 707/206 |
| 6,804,761 B1 * | 10/2004 | Chen et al. | 711/170 |
| 6,934,741 B1 * | 8/2005 | Shavit et al. | 709/214 |

* cited by examiner

MEMORY MODEL FOR A RUN-TIME ENVIRONMENT

RELATED APPLICATIONS

The present application is a continuation-in-part of U.S. patent application Ser. No. 09/512,620 filed on Feb. 25, 2000, the contents of which are hereby incorporated by reference.

The present application claims the benefit of U.S. Provisional Patent Application Ser. No. 60/378,391 filed on May 8, 2002, the contents of which are hereby incorporated by reference.

FIELD OF THE INVENTION

The present invention relates to computer systems and more particularly to a memory model for application servers employing a virtual machine in a run-time environment.

BACKGROUND OF THE INVENTION

Many web-based applications are designed in accordance with a three-tier model of a web client, an application server, and a database server. The Tier I web client is typically implemented as a browser executing on a personal computer that is in networked communication with the application server. The Tier II application server is responsible for implementing the procedural aspects of the web-based application such as authenticating the user at the web browser, validating and processing form data received from the web client, calculating results., and generating markup of the results to the web client. The Tier III database server is responsible for storing persistent state about the user of the application, such as the user's address and what products the user has ordered.

Many application servers are written in the JAVA™ programming language, originally developed by Sun Microsystems, Inc. One reason for the current popularity of the JAVA™ programming language is portability. Programs written in the JAVA™ programming language are compiled into virtual machine instructions called bytecodes and processed by a virtual machine, which is a body of software that acts as an interface between the compiled bytecodes and the hardware platform that actually performs the program's instructions. JAVA™ programming language programs are portable because any program compiled for that virtual machine can run on any hardware platform to which the virtual machine has been ported.

The JAVA™ programming language supports multi-threading, and therefore virtual machines for the JAVA™ programming language must incorporate multithreading capabilities. Multithreaded computing environments allow different parts of a process, known as threads, to execute concurrently. In recent years, multithreaded computing environments have become more popular because of the operating characteristics provided by multithreaded applications. For example, multithreaded application servers need to save and restore less runtime state for a thread than for a process, because some of the process data can be shared among its various threads.

Accordingly, Tier II application servers written in the JAVA™ programming language typically employ multi-threading capabilities, especially in an enterprise environment. In this environment, application servers are part of a large-scale server to which many users have concurrent access, spawning and destroying threads for each user as necessary to handle the current workload. Typically, applications servers that incorporate multi-threading virtual machines are configured to spawn a separate thread for each user session. For example, an application server may execute a thread that listens for a connection to be established (e.g. an HTTP request to arrive) through a particular port. When a connection is established, the listening thread passes the connection to another thread. The selected thread services the request, sends any results of the service back to the client, and blocks again, awaiting another connection. Alternatively, each socket through which a connection may be established may be assigned to a specific thread, and all connections made through a given socket are serviced by the associated thread.

Despite the performance characteristics provided by multithreaded computing environments, multithreaded computing has its disadvantages, particularly in data integrity and security. Specifically, maintaining the integrity of data structures and variables can be particularly challenging since more than one thread can access the same process data. Unlike separate processes in multiprocessing environments, threads typically share a single address space within a process and a set of global variables and are primarily distinguished by the value of their program counters and stack pointers. Consequently, the state of some commonly accessible data can be modified by one thread at the same time that the data is read by another thread, thus making the data unreliable.

To avoid such problems, application servers written in the JAVA™ programming language explicitly segregate data that pertains to each user ("user state") from other data ("runtime state"). In other words, developers of application servers must code themselves the instructions that separate the user state from the runtime state, typically by implementing a hash table or other look up data structure that is keyed on a unique user identifier. Accordingly, even though each thread has access to all the data in the application server process, developers must constrain the access of each thread to user state via the look up data structure.

Unfortunately, programs written in this manner of explicitly segregating user state are not scalable when ported to a Tier III multi-threaded database server, such as MTS™ available from Oracle Corp, which has a different approach to scalability. In such a Tier III multi-threaded database server, there is a distinction between session-duration memory and call-duration memory. Session-duration memory refers to the memory whose lifetime is bounded by a session, which is the period of time during which a user has established a connection to the database server, e.g. by logging in to the database server. Call-duration memory, on the other hand, refers to the memory actively being consumed to handle a request, during, for example, the processing of a database transaction. Although call-duration memory consumes much memory, the lifetime of call-duration memory is much shorter, thereby allowing call-duration memory to be recycled for the next active user. In this architecture, as long as there is enough memory to service the small percentage of sessions that are in active use, e.g. during a database call, the limiting factor for scalability in terms of user sessions depends on the amount of session-duration memory consumed-the smaller the size of the session-duration memory footprint, the more users who can concurrently log in.

When a Tier II multi-threaded application server is ported to a Tier III multi-threaded database server, however, there are several drawbacks because the process-specific state of the application server has to be saved in session memory on a per-session basis or be recreated at the beginning of each call. Either of these approaches is too expensive.

SUMMARY OF THE INVENTION

These and other needs are addressed by providing a process-specific area of memory where objects in call-specific area of memory and session-specific area of memory can be migrated to at the end of a database call. User-specific objects can be then migrated to the session-specific area of memory. In one embodiment, the process-specific area of memory can be saved in a disk file and used to hot start another instance of an application server.

Accordingly, one aspect of the invention related to a method and software for managing a memory for an application server in a run-time environment, which includes performing a call to a database server. At the end of the call, performing the steps of: (a) migrating, into a process specific area of memory, objects in a call-specific area of memory and objects in a session-specific area of memory that are reachable from the objects in the process-specific area of memory, and (b) migrating, into the session-specific area of memory, objects in the call-specific area of memory that are reachable from objects in the session-specific area of memory but not from objects in the process-specific area of memory.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for supporting a memory model for a run-time environment are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Memory Model

One embodiment of the present invention is illustrated with respect to a memory model that is implemented for a multi-user run-time environment. Accordingly, a detailed description of the memory model for this working example is provided, but the present invention is not limited to this example or to the use of this memory model.

Figure 1:
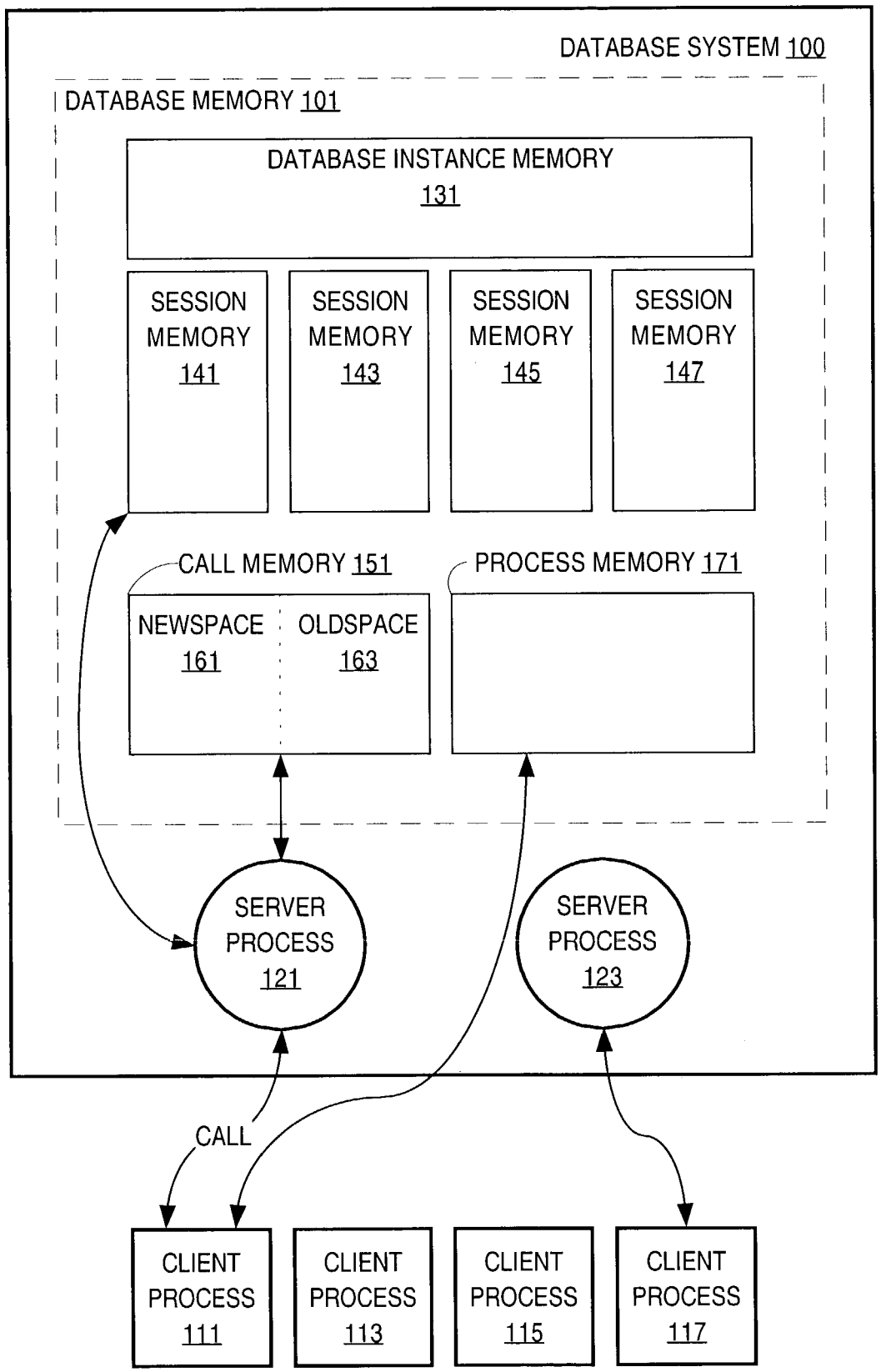
FIG. 1 depicts a memory model that can be used in conjunction with an embodiment of the present invention.

FIG. 1 schematically illustrates a multi-user database system 100 with which a run-time environment for a language such as the JAVA™ programming language may be used, although the present invention is not limited to multi-user database systems in particular and may be applied to other multi-user systems. In the illustrated configuration, client processes 111, 113, 115, and 117 establish database sessions with the database system 100. A database session refers to the establishment of a connection between a client and a database system through which a series of calls may be made. As long as the client remains connected in the database session, the client and the associated database session are referred to as being active. Active clients can submit calls to the database system 100 to request the database system 100 to perform tasks. One example of a call is a query in accordance with the Structured Query Language (SQL), and another example is a method invocation of a JAVA™ programming language object or class, defined for performing a database task for database system 100.

Database system 100 comprises, among other components, a database memory 101 for storing information useful for processing calls and a number of server processes 121 and 123 for handling individual calls. The database memory 101 includes various memory areas used to store data used by server processes 121 and 123. These memory areas include a database instance memory 131, session memories 141, 143, 145, and 147, call memory 151, and a process memory 171. It is to be understood that the number of the session memories, call memories, and process memories in FIG. 1 is merely illustrative and, in fact, the number of such memories will vary over time as various clients make various calls to the database system 100.

The database instance memory 131 is a shared memory area for storing data that is shared concurrently by more than one process. For example, shared memory area may be used to store the read-only data and instructions (e.g., bytecodes of JAVA™ programming language classes) that are executed by the server processes 121 and 123. The database instance memory 131 is typically allocated and initialized at boot time of the database system 100, before clients connect to the database system 100.

When a database session is created, an area of the database memory 101 is allocated to store information for the database session. As illustrated in FIG. 1, session memories 141, 143, 145, and 147 have been allocated for clients 111, 113, 115, and 117, respectively, for each of which a separate database session has been created. Session memories 141, 143, 145, and 147 are a shared memory used to store static data, i.e., data associated with a user that is preserved for the duration of a series of calls, especially between calls issued by a client during a single database session. JAVA™ programming language static class variables are one example of such static data.

A call memory, such as call memory 151, is used to store data that is bounded by the lifetime of a call. A database call may include execution of a query or other kind of Structured Query Language (SQL) statements or a group of such statements within a database transaction. When client 111 submits a call to the database system 200, one of server processes 121 or 123 is assigned to process the call. For the duration of the call, the server process is allocated a call memory for storing data and other information for use in processing the call. For example, server process 121 uses call memory 151 and session memory 141 for processing a call submitted by client process 111.

At any given time, a server process (e.g., processes 121, 123) is assigned to process a call submitted by a single client (e.g., clients 111, 113, 115, 117). After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

Process memory 171 is an area of memory that has the duration of a process and can be used to hold the virtual machine state of the process that is not user-specific. In one embodiment, use of the process memory 171 can be selectively available for specific processes. For example, process memory 171 may be available only for those processes that are started in a specific way, and sessions may be attached to such processes only they are intended to run the specific applications (e.g. an application server) that make use of the process memory 171 feature.

Memory Management

Figure 2:
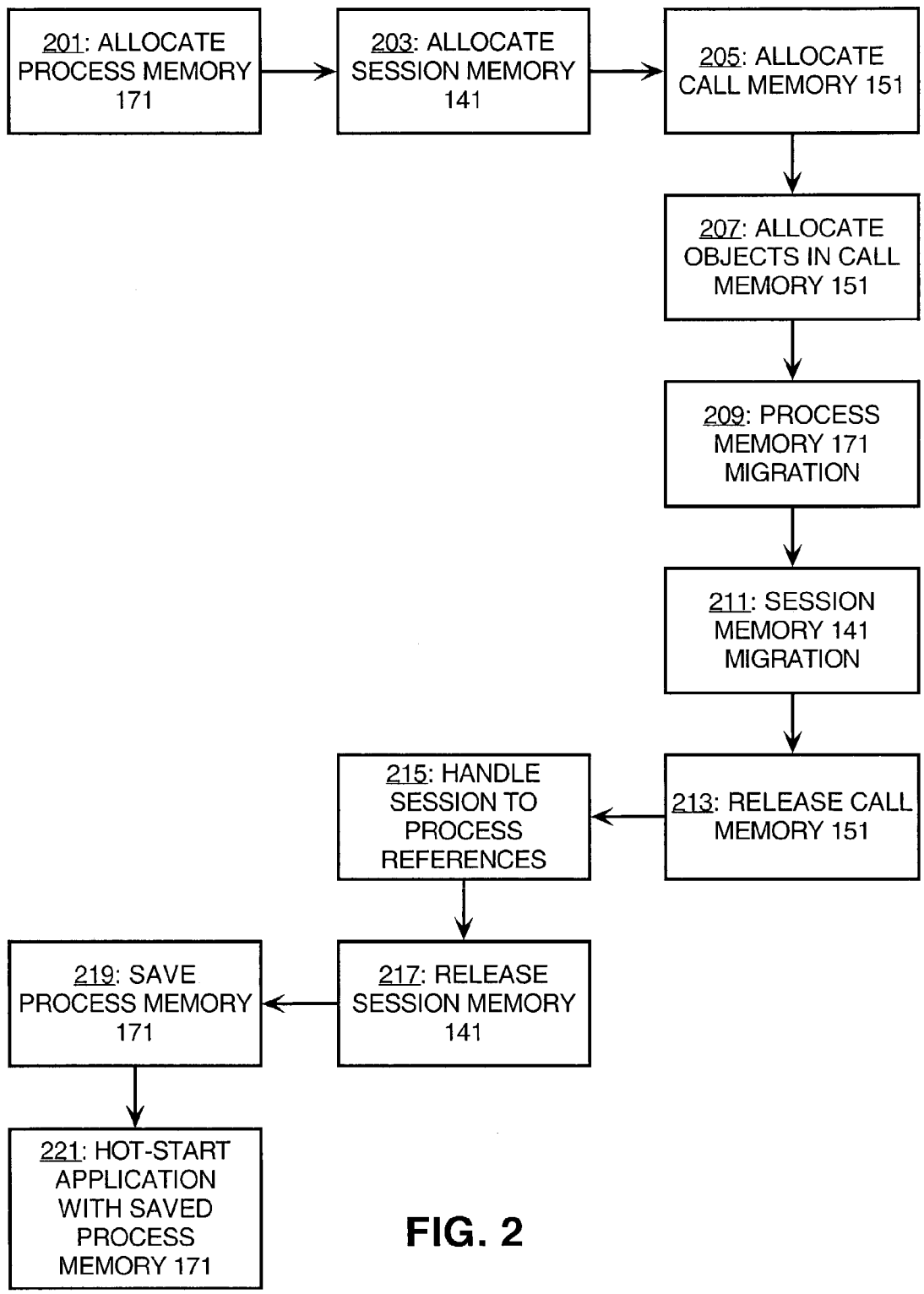
FIG. 2 is a flow chart illustrating memory management and end-of-call processing by one embodiment of the present invention.

FIG. 2 is a flow chart illustrating memory management and end-of-call processing by one embodiment of the present invention. At step 201, when a client process 111 for an application such as an application server is started, process memory 171 is allocated. When a session within the client process 111 is started, for example, when a client process 111 establishes a connection with a database server, the session memory 141 is allocated (step 203). When the client process 111 makes a database call, e.g. by submitting a SQL statement to the database server for execution, the call memory 151 is allocated for use. During the call, objects used by the client process 111 may be allocated out of call memory 151 (step 207). At the end of the call, the call memory 151 is to be deallocated to make room for reuse by another client, so live objects in the call memory 151 are to be migrated to an area of memory that is of longer duration.

Specifically, at step 209, objects reachable from objects in process memory 171 are migrated (or "tenured") from call memory 151 and session memory 141 into process memory 171 leaving behind forwarding references to the tenured objects. This operation is executed by performing a transitive closure on roots in process memory 171, starting from objects in process memory 171, following references from those objects to identify other objects that are reachable from the roots in process memory 171. To aid in this operation, ancillary data structures such as exit tables and remember tables may be consulted.

At step 211, migration of remaining objects in call memory 141 that are not reachable from roots in the process memory 171 but from the session memory 141 is performed. These objects include user-specific state because access to the user-specific state occurs, not through following references from a process memory 171 object, but by invoking a native method that accesses the user data hash table. References from session memory 141 to process memory 171, however, are not tenured.

At the end of session migration in step 211, those objects remaining in call memory 151 are not reachable from longer-duration memories such as session memory 141 and process memory 171. In other words, these objects are not live and may be disposed of by releasing the call memory 151 for use by another process (step 213).

At the end of step 209, 211, and 213, the process memory 171 is self-contained, except for external references, and the session memory 141 is also self-contained, except possibly for references into the process memory 171. If there are such references from session memory 141 into process memory 171, the session memory 141 is garbage collected to make sure than any such remaining references from the session memory 141 into the process memory 171 are live.

If there are indeed live references remaining in the session memory 141 that point to the process memory 171, various approaches for handling this case (step 215) can be employed, although the present invention is not limited to any one particular approach or particular combination of approaches. For example, in one embodiment, if such references exist, then the call is not terminated but put asleep; this act leaves the session attached to the client process 111. As another example, the session can be marked as runnable by only the particular client process 111. In either of these approaches, no other process 113 may access the session memory 141, and the objects in process memory 171 referenced by objects in session memory 141 become conservative roots that cannot be garbage collected or relocated until the session runs again or terminates.

Another approach to handle live references from the session memory 141 into the process memory 171 is to make symbolic references (similar to external references) or clones of the process memory 171 state that is referenced by session memory 141 objects. Alternatively, an error may be signaled to aid developers whose design of the application would forbid such references from user-specific state to process-specific state.

After the references from the session memory 141 into the process memory 171 have been properly handled in step 215, the session memory 141 can be deallocated at the end of the session (step 217), as when the user logs out of a database session, without adversely affecting the process memory 171 state. These steps help support a programming model of "everything is shared (i.e., in the process memory 171) unless explicitly stated otherwise (user-specific state in session memory 141 reachable by a native method)" that is characteristic of many application servers that have been designed for a Tier II location.

Steps 219 and 221 relate to a feature associated with one aspect of the present invention, in which the process memory 171 can be saved to disk (step 219) at an appropriate point (e.g. when all the current, user-sessions are quiescent) to enable an application server to be hot-started using the saved processed memory 171 (step 221). When an application server normally starts, the application server has to do much work in allocating memory, initializing data structure, loading information from disk, and other start up operations that take much time. However, the process memory 171 already has these data structures in an initialized state, another process of the application server can be started using the saved process memory 171 state, e.g. by memory mapping the active regions of memory saved in a file, to by-pass the time-consuming initialization procedures and restart the application server quickly. This savings can be particularly valuable in disaster recovery situations by allowing the application server to restart much more quickly on a computer system other than the one that has crashed. Another reason for saving to disk and restoring is to duplicate or "fork" the process state of the application server for load balancing sessions associated with the process that is being duplicated. Accordingly, the process heaps are recreated at precisely the same virtual addresses, allowing even locked sessions to be run in the new environment.

Hardware Overview

Figure 3:
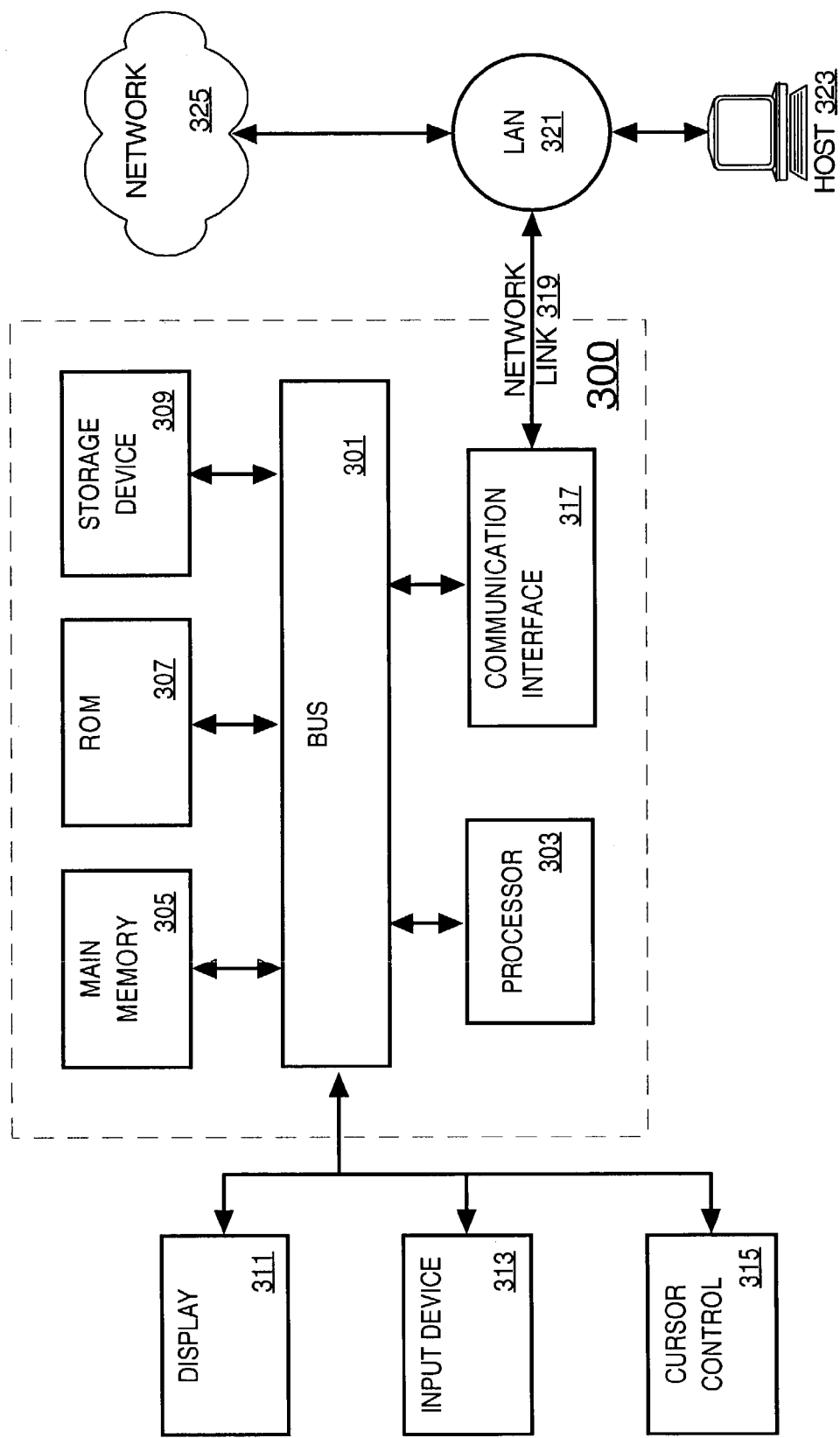
FIG. 3 depicts a computer system that can be used to implement an embodiment of the present invention.

FIG. 3 illustrates a computer system 300 upon which an embodiment according to the present invention can be implemented. The computer system 300 includes a bus 301 or other communication mechanism for communicating information and a processor 303 coupled to the bus 301 for processing information. The computer system 300 also includes main memory 305, such as a random access memory (RAM) or other dynamic storage device, coupled to the bus 301 for storing information and instructions to be executed by the processor 303. Main memory 305 can also be used for storing temporary variables or other intermediate information during execution of instructions by the processor 303. The computer system 300 may further include a read only memory (ROM) 307 or other static storage device coupled to the bus 301 for storing static information and instructions for the processor 303. A storage device 309, such as a magnetic disk or optical disk, is coupled to the bus 301 for persistently storing information and instructions.

The computer system 300 may be coupled via the bus 301 to a display 311, such as a cathode ray tube (CRT), liquid crystal display, active matrix display, or plasma display, for displaying information to a computer user. An input device 313, such as a keyboard including alphanumeric and other keys, is coupled to the bus 301 for communicating information and command selections to the processor 303. Another type of user input device is a cursor control 315, such as a mouse, a trackball, or cursor direction keys, for communicating direction information and command selections to the processor 303 and for controlling cursor movement on the display 311.

According to one embodiment of the invention, supporting a memory model for a runtime environment is provided by the computer system 300 in response to the processor 303 executing an arrangement of instructions contained in main memory 305. Such instructions can be read into main memory 305 from another computer-readable medium, such as the storage device 309. Execution of the arrangement of instructions contained in main memory 305 causes the processor 303 to perform the process steps described herein. One or more processors in a multi-processing arrangement may also be employed to execute the instructions contained in main memory 305. In alternative embodiments, hard-wired circuitry may be used in place of or in combination with software instructions to implement the embodiment of the present invention. Thus, embodiments of the present invention are not limited to any specific combination of hardware circuitry and software.

The computer system 300 also includes a communication interface 317 coupled to bus 301. The communication interface 317 provides a two-way data communication coupling to a network link 319 connected to a local network 321. For example, the communication interface 317 may be a digital subscriber line (DSL) card or modem, an integrated services digital network (ISDN) card, a cable modem, a telephone modem, or any other communication interface to provide a data communication connection to a corresponding type of communication line. As another example, communication interface 317 may be a local area network (LAN) card (e.g. for Ethernet™ or an Asynchronous Transfer Model (ATM) network) to provide a data communication connection to a compatible LAN. Wireless links can also be implemented. In any such implementation, communication interface 317 sends and receives electrical, electromagnetic, or optical signals that carry digital data streams representing various types of information. Further, the communication interface 317 can include peripheral interface devices, such as a Universal Serial Bus (USB) interface, a PCMCIA (Personal Computer Memory Card International Association) interface, etc. Although a single communication interface 317 is depicted in FIG. 3, multiple communication interfaces can also be employed.

The network link 319 typically provides data communication through one or more networks to other data devices. For example, the network link 319 may provide a connection through local network 321 to a host computer 323, which has connectivity to a network 325 (e.g. a wide area network (WAN) or the global packet data communication network now commonly referred to as the "Internet") or to data equipment operated by a service provider. The local network 321 and the network 325 both use electrical, electromagnetic, or optical signals to convey information and instructions. The signals through the various networks and the signals on the network link 319 and through the communication interface 317, which communicate digital data with the computer system 300, are exemplary forms of carrier waves bearing the information and instructions.

The computer system 300 can send messages and receive data, including program code, through the network(s), the network link 319, and the communication interface 317. In the Internet example, a server (not shown) might transmit requested code belonging to an application program for implementing an embodiment of the present invention through the network 325, the local network 321 and the communication interface 317. The processor 303 may execute the transmitted code while being received and/or store the code in the storage device 309, or other non-volatile storage for later execution. In this manner, the computer system 300 may obtain application code in the form of a carrier wave.

The term "computer-readable medium" as used herein refers to any medium that participates in providing instructions to the processor 305 for execution. Such a medium may take many forms, including but not limited to non-volatile storage media, volatile storage media, and transmission media. Non-volatile media include, for example, optical or magnetic disks, such as the storage device 309. Volatile media include dynamic memory, such as main memory 305. Transmission media include coaxial cables, copper wire and fiber optics, including the wires that comprise the bus 301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method of managing a memory for an application server in a run-time environment, comprising:
   performing a call to a database server; and
   at the end of the call, performing the steps of:
      migrating, into a process-specific area of memory, objects in a call-specific area of memory and objects in a session-specific area of memory that are reachable from the objects in the process-specific area of memory, and
      migrating, into the session-specific area of memory, objects in the call-specific area of memory that are reachable from objects in the session-specific area of memory but not from objects in the process-specific area of memory.

2. A method as according to claim 1, wherein the session is bounded by a period in which a client has established a connection to a database session.

3. A method as according to claim 1, further comprising:
   determining, after said migrating into the session-specific area of memory, whether there is a live reference from the session-specific area of memory to the process-specific area of memory; and
   if there is a live reference from the session-specific area of memory to the process-specific area of memory, then leaving a session of the application server that performed the call attached to a process of the application that performed the call.

4. A method as according to claim 1, further comprising:
   determining, after said migrating into the session-specific area of memory, whether there is a live reference from the session-specific area of memory to the process-specific area of memory; and
   if there is a live reference from the session-specific area of memory to the process-specific area of memory, then marking a session of the application server that performed the call as runnable only a process of the application that performed the call.

5. A method as according to claim 1, further comprising:
   determining, after said migrating into the session-specific area of memory, whether there is a live reference from the session-specific area of memory to the process-specific area of memory; and
   if there is a live reference from the session-specific area of memory to the process-specific area of memory, then cloning state in the process-specific area of memory referenced by the live reference.

6. A method as according to claim 1, further comprising:
   determining, after said migrating into the session-specific area of memory, whether there is a live reference from the session-specific area of memory to the process-specific area of memory; and
   if there is a live reference from the session-specific area of memory to the process-specific area of memory, then replacing the live reference by a symbolic reference.

7. A method as according to claim 1, further comprising:
   determining, after said migrating into the session-specific area of memory, whether there is a live reference from the session-specific area of memory to the process-specific area of memory; and
   if there is a live reference from the session-specific area of memory to the process-specific area of memory, then signaling an error.

8. A method as according to claim 1, further comprising:
   saving data in the process-specific area of memory to a disk file.

9. A method as according to claim 8, further comprising:
   hot-starting another process of the application based on the disk file that contains the saved data from the process-specific area of memory.

10. A computer-readable medium storage bearing instructions for managing memory for an application server in a run-time environment, said instructions being arranged to perform the method according to claim 1 upon execution by one or more processors.

11. A method of managing a memory for an application server in a run-time environment, comprising:
    allocating a process-specific area of memory for holding objects used by the application server;
    allocating a session-specific area of memory for holding objects used by the application server;
    at a beginning of a call to a database server, allocating a call-specific area of memory;
    during the call, allotting memory for objects in the call-specific area of memory; and at an end of the call, performing the steps of:
       migrating, into the process-specific area of memory, objects in the call-specific area of memory and objects in the session-specific area of memory that are reachable from the objects in the process-specific area of memory,
       migrating, into the session-specific area of memory, objects in the call-specific area of memory that are reachable from the objects in the session-specific area of memory but not from the objects in the process-specific area of memory, and
       releasing the call-specific area of memory.

12. A method as according to claim 11, wherein the session is bounded by a period in which a client has established a connection to a database session.

13. A method as according to claim 11, further comprising:
    determining, after said migrating into the session-specific area of memory, whether there is a live reference from the session-specific area of memory to the process-specific area of memory.

14. A method as according to claim 13, further comprising:
if there is a live reference from the session-specific area of memory to the process-specific area of memory, then performing one of the following steps of:
leaving a session of the application server that performed the call attached to a process of the application that performed the call;
marking a session of the application server that performed the call as runnable only a process of the application that performed the call;
cloning state in the process-specific area of memory referenced by the live reference;
replacing the live reference by a symbolic reference; and
signaling an error.

15. A computer-readable medium storage bearing instructions for managing memory for an application server in a run-time environment, said instructions being arranged to perform the method according to claim 11 upon execution by one or more processors.

16. A method of managing a memory for an application server in a run-time environment, comprising:
allocating a process-specific area of memory for holding objects used by the application server;
at a beginning of a session with a database server, allocating a session-specific area of memory for holding objects used by the application server;
at a beginning of a call to a database server, allocating a call-specific area of memory;
during the call, allotting memory for objects in the call-specific area of memory;
at an end of the call, performing the steps of:
migrating, into the process-specific area of memory, objects in the call-specific area of memory and objects in the session-specific area of memory that are reachable from the objects in the process-specific area of memory,
migrating, into the session-specific area of memory, objects in the call-specific area of memory that are reachable from the objects in the session-specific area of memory but not from the objects in the process-specific area of memory, and
releasing the call-specific area of memory; and
at the end of the session, releasing the session-specific area of memory.

17. A method as according to claim 16, wherein the session is bounded by a period in which a client has established a connection to a database session.

18. A method as according to claim 16, further comprising:
determining, after said migrating into the session-specific area of memory, whether there is a live reference from the session-specific area of memory to the process-specific area of memory.

19. A method as according to claim 18, further comprising:
if there is a live reference from the session-specific area of memory to the process-specific area of memory, then performing one of the following steps of:
leaving a session of the application server that performed the call attached to a process of the application that performed the call;
marking a session of the application server that performed the call as runnable only a process of the application that performed the call;
cloning state in the process-specific area of memory referenced by the live reference;
replacing the live reference by a symbolic reference; and
signaling an error.

20. A computer-readable medium storage bearing instructions for managing memory for an application server in a run-time environment, said instructions being arranged to perform the method according to claim 16 upon execution by one or more processors.

* * * * *